April 25, 1933. C. W. GARDINER 1,906,147
BAND CONVEYER
Filed Jan. 14, 1932
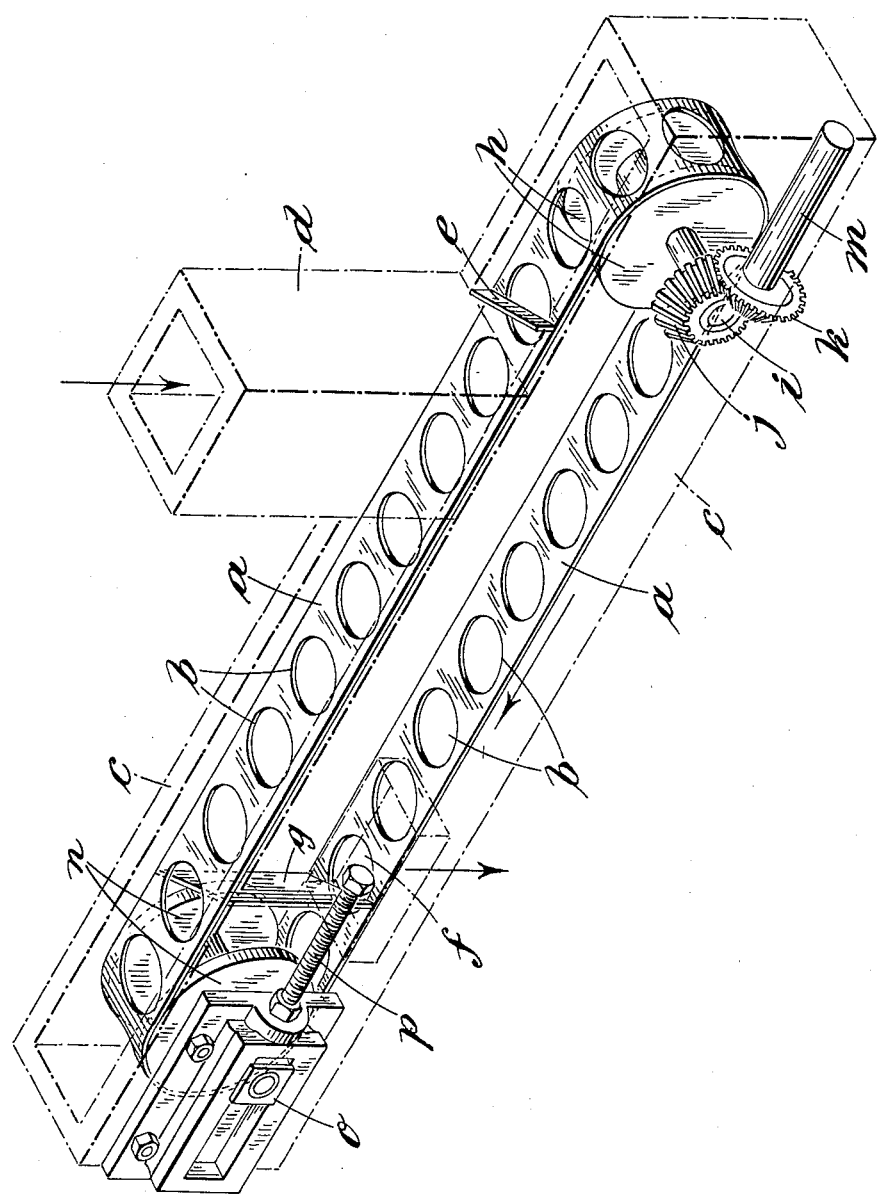

Patented Apr. 25, 1933

1,906,147

UNITED STATES PATENT OFFICE

CHARLES WILLIAM GARDINER, OF HIGH BARNET, ENGLAND, ASSIGNOR TO GARDINER'S CONVEYORS LIMITED, OF LONDON, ENGLAND, A BRITISH COMPANY

BAND CONVEYER

Application filed January 14, 1932. Serial No. 586,671, and in Great Britain January 15, 1931.

This invention relates to band conveyers of the type wherein one or both of the runs is, or are, adapted to rest and travel upon a platform adjoining, or forming part of, the band casing and has for its object to provide improvements in conveyers of this character.

In this specification, the term "band", as applied to a conveyer. is to be construed as meaning an inherently flexible strip of material without articulations, as distinct from conveyer belts comprising an articulated chain-like structure composed of links pivotally connected to one another.

In previously known band conveyers of the type described, the material conveyed has been made to overshoot into a discharge arrangement, but according to the present invention the band is liberally perforated to permit discharge of the conveyed material through the band and any part of the supporting platform which has been apertured or cut away.

According to the invention, there is provided in a band conveyer of the type wherein one or both of the runs is or are adapted to rest and travel upon a platform adjoining, or forming part of, the band casing, the construction wherein the band comprises a strip of inherently flexible material without articulations and is liberally perforated to permit discharge of the conveyed material through the band and any part of the supporting platform which has been apertured or cut away.

In one embodiment of the invention the lower run can be loaded through the upper run and the space absorbed by the feed and discharge arrangements is very much reduced.

The bulk of the material being conveyed is supported by and travels along the platform or flooring forming the casing, that which rests on the band serving to push that which lies within the perforations, and owing to the size of the latter, the actual weight of the band is very little compared with that of ordinary belts, and very little power is required to operate them.

Such bands are very conveniently made of steel, but other metals and materials such as canvas or rubber may be used where required. The perforations may be of such size as is most suited to the width of band used and the class of material to be handled.

The holes may be arranged in the form necessary to give the largest area of opening, the greatest tensile strength, and where convenient with a row suitable for engaging with toothed driving wheels. The arrangement may vary to suit different materials in the band, the materials to be conveyed and other circumstances.

One way of carrying out this invention is illustrated in the accompanying drawing, which is a diagrammatic perspective view of a short length of band adapted to perform the complete operation of receiving, conveying and subsequently discharging the conveyed material.

The band $a$ is perforated with a single line of holes $b$, and as to its lower side runs along and is supported by the bottom of the casing $c$ which forms a platform for it. In the top of the casing $c$ is an aperture at the bottom of the feed passage $d$ from which the material falls through and on to the band $a$. The wiper $e$ causes all material to fall through the band on to the lower run traveling in the opposite direction. The material heaped on the band $a$ causes the material lying in the holes $b$ and on the platform to be pushed along and travel with the band, but when it arrives at the discharge orifice $f$ in the platform $c$ it falls through, any remaining on the band being removed by the wiper $g$.

The band is driven by wheels $h$ $h$ on the live axle $i$ which carries a bevel wheel $j$ meshing with a similar wheel $k$ on the shaft $m$. At the opposite end is a similar pair of wheels $n$ $n$, which are not driven but are adapted to keep the band in tension through the sliding axle block $o$, and tension bolt $p$, duplicates of which may be on the other side of the casing.

The perforations $b$ may be in double or multiple rows and may be staggered so that the discharge is more even; they may be of differing sizes in one band, besides varying in different bands to suit the types of material to be dealt with.

The feed and discharge openings may be multiple, and may occupy the whole or only part of the band width as may be required.

Below the inlet shoot the upper run may be suitably supported so that the weight of the grain falling on to the band will not distort and displace it as it falls through on to the lower run.

A band conveyer constructed on this principle will accept, convey and discharge grain with a minimum of attrition, in an expeditious manner, without choking or breakage. It is very cheap to construct, small in size for capacity, and can be fitted in any convenient space where other types cannot be used.

It will be understood that the thickness of band can be varied as can also the size and position of the perforations, and that it is necessary to do so to attain the best performance with different materials, but that a conveyer made as described will handle a great variety of materials for which the material and openings are suitable.

Such perforated bands can be used in various ways without departing from the scope of the invention, the inlets or discharges may be multiplied, and the drive varied as most convenient.

What is claimed is:—

1. In a band conveyer for finely divided materials in bulk, a band casing, a platform associated therewith, a perforated band comprising a strip of inherently flexible material without articulations operable in said band casing and discharge means formed in said platform adapted to coact with the perforations in said band structure, whereby the conveyed material can pass through the perforations in said band structure and be discharged through the platform discharge means.

2. In a band conveyer for finely divided materials in bulk, a band casing, smooth wheels mounted in association therewith, a perforated band comprising a strip of inherently flexible material without articulations adapted to travel around said wheels, means for loading the material to be conveyed through the upper part of said casing, a discharge outlet formed in the bottom of said casing and means for driving said band, whereby the perforations in said band are successively brought into register with the said discharge outlet to effect discharge of the conveyed material.

3. In a band conveyer for finely divided materials in bulk a band casing, an apertured platform forming the bottom of said casing, a perforated band comprising a strip of inherently flexible material without articulations adapted to travel with its lower run resting on and supported by said platform, and means for loading the material so as to pass through the upper run of said band, the said material lying on the portion of the band between the perforations serving as the principal means for transmitting to the material lying over the perforations the force exerted by said band.

4. In a band conveyer for finely divided materials in bulk, a band casing, wheels mounted in association therewith, a perforated band comprising a strip of inherently flexible material without articulations adapted to travel around said wheels, means for loading the material to be conveyed through the upper part of said casing, a discharge outlet formed in the bottom of said casing, means for driving said band and a wiper adapted to wipe the material off said band and cause it to fall through the perforations as they are successively brought into register with the said discharge outlet.

5. In a band conveyer for finely divided materials in bulk, a band casing, wheels mounted in association therewith, a perforated band comprising a strip of inherently flexible material without articulations adapted to travel around said wheels, means for loading the material to be conveyed through the upper part of said casing, a discharge outlet formed in the bottom of said casing, means for driving said element and a wiper located adjacent the point of loading adapted to wipe the material off the upper run of said band and cause it to fall through the perforations onto the lower run of said band.

6. A conveyer for finely divided materials in bulk comprising, a housing having inlet and outlet openings, a perforated endless band formed of flexible sheet material and without articulations, platform means extending to said outlet opening for supporting said band, means mounting said band for movement past both of said openings, and means for driving said band to convey from the inlet opening to the outlet opening material supported upon the band and upon those portions of the platform lying under the perforations in said band.

7. The invention as set forth in claim 6, wherein said driving means includes a smooth roller member.

8. The invention as set forth in claim 6, wherein said band is of such thickness that the band conveys the materials without substantial turbulence.

9. The invention as set forth in claim 6, wherein said band is of such thickness that substantially the entire force exerted in transporting the materials is transmitted from the band through that portion of the material which is supported by the band.

In testimony whereof, he has affixed his signature.

CHARLES WILLIAM GARDINER.